United States Patent [19]

Tiemann

[11] Patent Number: 5,578,877
[45] Date of Patent: Nov. 26, 1996

[54] APPARATUS FOR CONVERTING VIBRATORY MOTION TO ELECTRICAL ENERGY

[75] Inventor: Jerome J. Tiemann, Schenectady, N.Y.

[73] Assignee: General Electric Company, Schenectady, N.Y.

[21] Appl. No.: 258,869

[22] Filed: Jun. 13, 1994

[51] Int. Cl.⁶ .......................... B61L 25/02; H02K 35/02
[52] U.S. Cl. .............................. 310/15; 310/17; 290/1 R; 342/457
[58] Field of Search ................................. 310/15, 17, 28, 310/29, 31; 342/357, 457; 290/1 R, 42, 53, 54, 55

[56] References Cited

U.S. PATENT DOCUMENTS

| | | | |
|---|---|---|---|
| 3,766,399 | 10/1973 | Demetvescu | 290/40 |
| 4,500,827 | 2/1985 | Merritt et al. | 310/15 X |
| 5,129,605 | 7/1992 | Burns et al. | 246/5 |
| 5,223,844 | 6/1993 | Mansell et al. | 342/357 |
| 5,225,842 | 7/1993 | Brown et al. | 342/357 |

FOREIGN PATENT DOCUMENTS

| | | | |
|---|---|---|---|
| 3543043 | 6/1986 | Germany | 310/12 |

OTHER PUBLICATIONS

Swords Into Plowshares "A Smart Approach To Freight Damage Prevention" By Tim Slifkin, Elexor Associates, Inc., pp. 1-5 date unknown.

"G-Sensing Derailment Detector" U.S. Dept. Of Commerce, National Technical Information Service, Report No. PB81-127466, Paul Nace—Oct. 1980, Title Page & pp. 5-1/5-5.

*Primary Examiner*—Steven L. Stephan
*Assistant Examiner*—Judson H. Jones
*Attorney, Agent, or Firm*—Marvin Snyder

[57] ABSTRACT

An apparatus for convening vibratory motion along a predetermined vibration axis to electrical energy comprises an enclosure having first and second opposite walls substantially parallel to one another. A magnet carrier structure in the enclosure also has first and second opposite walls substantially parallel to one another. A pair of springs suspend the carrier structure in the enclosure so that corresponding first walls and corresponding second walls, respectively, face one another with a predetermined spacing therebetween. The springs allow reciprocating movement of the carrier structure relative to the enclosure only along the vibration axis in response to the vibratory motion. Separate magnet sets, each comprising a row of permanent magnets, are attached to a respective outer surface of the first and second walls of the carrier structure for producing a respective magnet flux. Separate coil assembly sets, substantially configured and dimensioned like the magnet rows, are attached to a respective inner surface of the first and second walls of the enclosure and are situated to be magnetically coupled to a corresponding one of the separate magnet sets in order to produce electrical current due to magnetic flux changes whenever the carrier structure and the enclosure move reciprocally with respect to one another along the vibration axis.

30 Claims, 6 Drawing Sheets

5,578,877

APPARATUS FOR CONVERTING VIBRATORY MOTION TO ELECTRICAL ENERGY

RELATED APPLICATIONS

This application is related to patent application Ser. No. 08/233,091, entitled "Mobile Tracking Units Employing Motion Sensors for Reducing Power Consumption Therein", by Welles et al., filed Apr. 25, 1994; patent application Ser. No. 08/238,772, entitled "Mobile Tracking Unit Capable of Detecting Defective Conditions in Railway Vehicle Wheels and Railtracks", by Welles et al., filed May 5, 1994; and patent application Ser. No. 08/245,711, entitled "Apparatus and Method for Detecting Defective Conditions in Railway Vehicle Wheels and Railtracks", by Welles et al., filed May 5, 1994, all assigned to the assignee of the present invention and herein incorporated by reference.

BACKGROUND OF THE INVENTION

The present invention relates to power generators and, more particularly, to an apparatus for converting vibratory motion to electrical energy.

There are situations where transportation conveyances that generally have no available power source, such as freight railcars, shipping containers and the like, have a need for electrical power. For instance, transportation conveyances which incorporate mobile tracking units have a need for efficient and durable power sources capable of being readily integrated therein at a low cost and with a relatively high degree of portability. Typically, the mobile tracking unit includes electrically powered devices, such as radios for determining and reporting vehicle position data from time to time to a remote location, and electronic sensors for sensing and recording predetermined ambient conditions in the vehicle. Photovoltaic power sources, such as solar panels, are subject to disadvantages due to reduced or no power being generated because of poor or no sunlight availability encountered during nights, winter seasons, physical locations, cloudy weather and other circumstances which substantially limit the availability of sunlight to the solar panel.

In the case of rail transportation, for example, when travelling over an average railbed, railcars generally experience significant levels of vibratory motion along a vibration axis which is vertically oriented with respect to the railbed due to unevenness of the railbed and even to wheelset irregularities. Other land-based vehicles, such as tractor trailers and the like, may experience similar vibratory motion. In each case, there is a need to provide an apparatus which can efficiently harness the vibratory motion of the vehicle to provide significant amounts of electrical power regardless of sunlight conditions. Prior techniques which have suggested use of various devices, such as geophones, for converting vibratory motion to electrical energy in general have not been very successful since they are generally designed for relatively small amplitude vibrations. Under relatively large amplitude vibrations (e.g., more than about 1 cm), these devices are prone to magnetic detenting effects which detrimentally reduce their power generating efficiency. Thus there is a need for techniques that advantageously avoid magnetic detenting effects (i.e., the tendency of armatures to become stuck in one preferred spot due to magnetomotive forces) in order to allow for relatively efficient production of electrical power from vibration motion.

SUMMARY OF THE INVENTION

Generally speaking, the present invention fulfills the foregoing needs by providing an apparatus for converting vibratory motion along a predetermined vibration axis to electrical energy. The apparatus comprises an enclosure having first and second opposite walls substantially parallel to one another. A carrier structure, such as a box-like structure, in the enclosure also has first and second opposite walls substantially parallel to one another. Suspension means, such as flexural springs and the like, allows for suspending the carrier structure in the enclosure so that corresponding first walls and corresponding second walls, respectively, face one another with a predetermined spacing therebetween. The suspension means is suitably designed to allow reciprocating movement of the carrier structure relative to the enclosure substantially only along the vibration axis in response to the vibratory motion. Separate magnet means, such as rows of permanent magnets, are attached to a respective outer surface of the first and second walls of the carrier structure for producing a respective magnetic flux. Separate coil assembly means, such as armature rows and armature-row windings, substantially configured and dimensioned like the magnet rows, are attached to the respective inner surface of the first and second walls of the enclosure and are situated to be magnetically coupled to a corresponding one of the separate magnet means in order to produce electrical current due to magnetic flux changes whenever the carrier structure and the enclosure move reciprocally with respect to one another along the vibration axis.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like parts throughout the drawings, and in which:

DETAILED DESCRIPTION OF THE INVENTION

The present invention provides an apparatus for efficiently converting vibratory motion to electrical energy. The apparatus can, for example, be advantageously used with mobile tracking units that operate in a power-starved environment.

The mobile tracking units can be conveniently employed for a vehicle tracking or monitoring system which provides vehicle location information using navigation data derived from an existing navigation system, such as the orbiting Global Positioning System (GPS) satellite constellation, thereby providing highly accurate, real-time, vehicle tracking capability. The tracking system is particularly useful in fleet vehicle management, railcar tracking, cargo location and the like. For the purposes of this invention the term "vehicle" includes shipping containers and other such means of carrying or transporting goods onboard a train or rail vehicle and other land-based vehicles.

Figure 1:
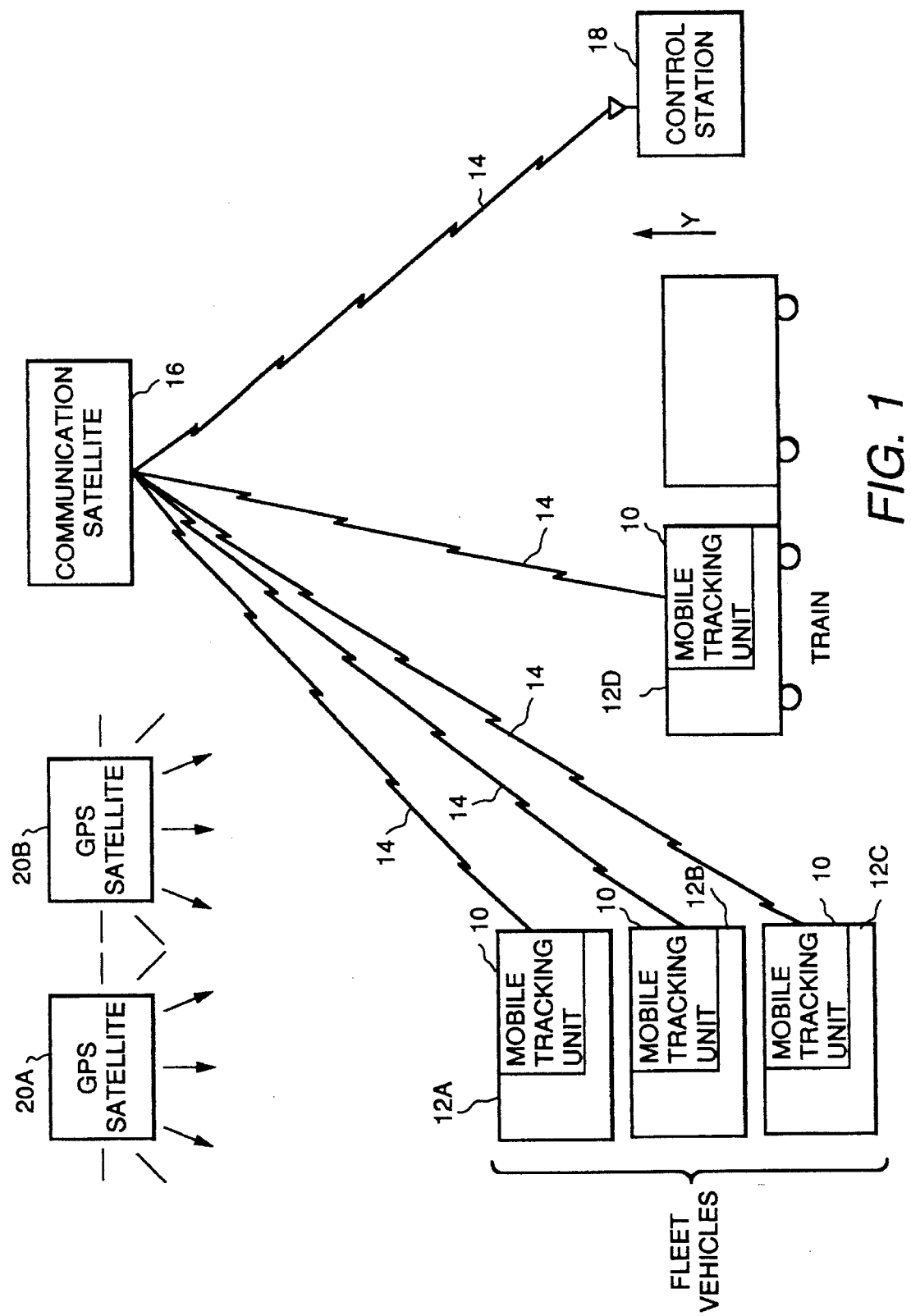
FIG. 1 is a block diagram of an exemplary vehicle tracking system which can employ a mobile tracking unit using a power generating apparatus in accordance with the present invention.

FIG. 1 shows a set of mobile tracking units 10 installed in respective vehicles 12A–12D which are to be tracked or monitored. The mobile tracking units employ navigation signals from a GPS satellite constellation, although other navigation systems can be used in lieu of GPS. A multiple communication link 14, such as a satellite communication link using a communication satellite 16, can be provided between each mobile tracking unit 10 and a remote control station 18 manned by one or more operators and having suitable display devices and the like for displaying location and status information for each vehicle equipped with a respective mobile tracking unit. GPS is a particularly attractive navigation system to employ, being that the respective orbits of the GPS satellites are chosen so as to provide substantially world-wide coverage and being that such highly-accurate radio signals are made available free of charge to users by the U.S. federal government. Communication link 14 can be conveniently used for transmitting vehicle conditions or events measured with suitable sensing elements. As previously suggested, because railcars and other land-based vehicles travelling over any average railbed or roadbed, respectively, experience substantial vibratory motion along a generally vertical vibration axis (shown as axis Y in FIG. 1), it is particularly useful to convert vibratory motion along that vibration axis to electrical energy. As used herein, the term vibratory motion includes any excursion and oscillatory or alternating movement along vibration axis Y due principally (but not limited) to factors such as unevenness of the railbed or roadbed, wheelset irregularities and the like.

Figure 2:
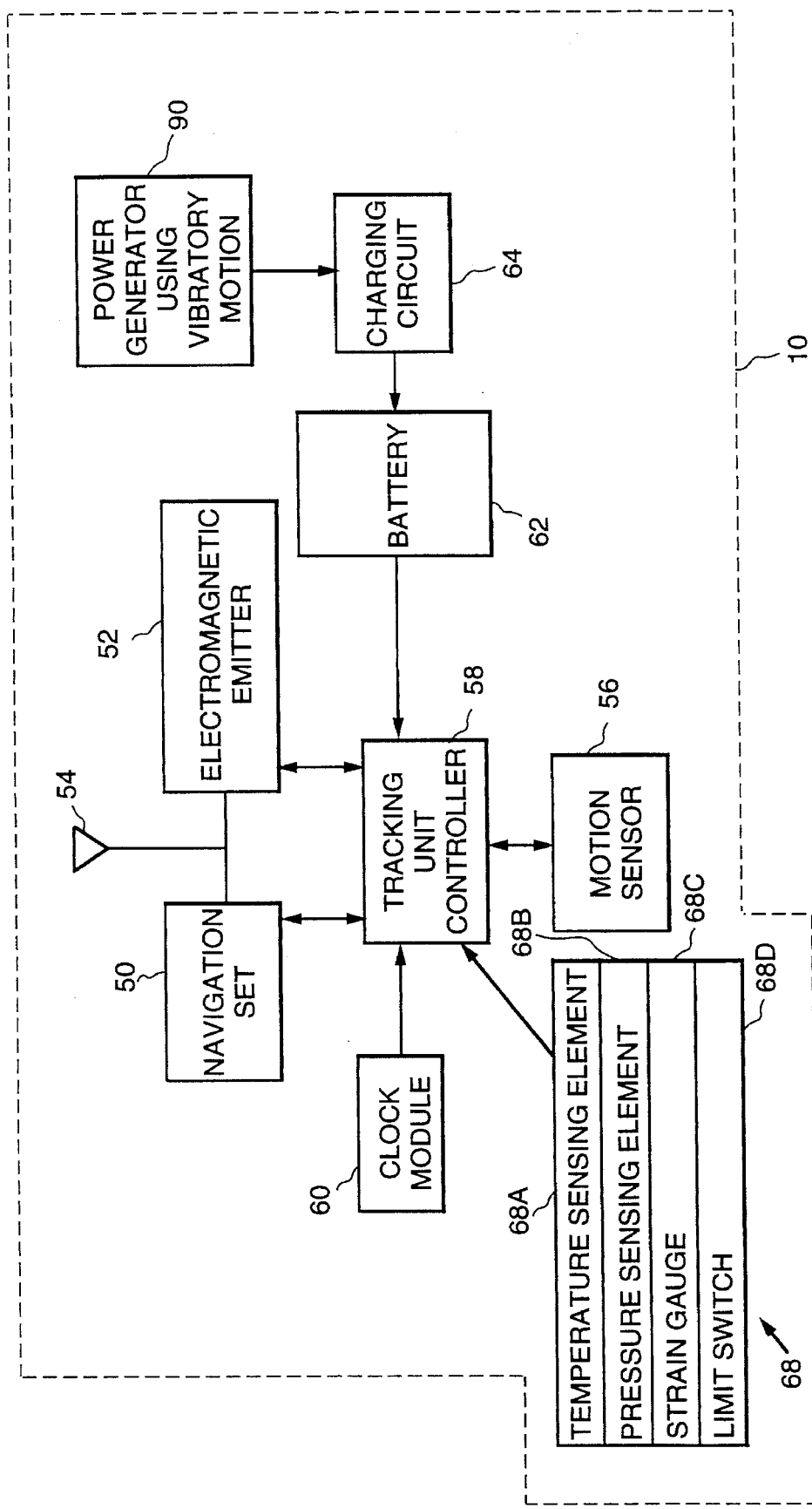
FIG. 2 is a block diagram illustrating further details of the mobile tracking unit shown in FIG. 1.

FIG. 2 shows that mobile tracking unit 10 includes a navigation set 50 capable of generating data substantially corresponding to the vehicle position. The navigation set is chosen depending on the particular navigation system used for supplying navigation signals to a given mobile tracking unit. Preferably, the navigation set is a GPS receiver such as a multichannel receiver. However, it should be apparent that other receivers designed for acquiring signals from a corresponding navigation system may alternatively be employed. For example, the navigation set, depending on the vehicle position accuracy requirements, can be chosen as a Loran-C receiver or other such less highly-accurate navigation receiver than a GPS receiver. In each case, however, the power consumed by the navigation set imposes a severe constraint for reliable and economical operation of the mobile tracking unit in vehicles which do not normally carry power sources like shipping containers, railroad freight cars and the like. For example, typical GPS receivers currently available generally consume as much as 2 watts of electrical power. Mobile tracking unit 10 may include a suitable electromagnetic emitter 52 capable of transmitting the vehicle position data by way of communication link 14 (FIG. 1) to satellite 16 and eventually to the control station. A single, low profile antenna 54 can be conveniently used for both GPS signal acquisition and transmission to the satellite. Electromagnetic emitter 52 further adds to the power consumption of the mobile tracking unit. A motion sensor 56, such as a low power accelerometer, vibration sensor, acoustical sensor or combination thereof, is coupled to a tracking unit controller 58 so as to supply to controller 58 data indicative of vehicle motion for reducing power consumption under predetermined conditions, as described in U.S. patent application Ser. No. 08/233,091, (RD-23,332) by K. Welles et al, entitled "Mobile Mobile Tracking Units Employing Motion Sensors for Reducing Power Consumption Therein", assigned to the assignee of the present invention and herein incorporated by reference. The tracking unit controller may comprise a multi-bit, single chip digital microcontroller, suitably programmed, as explained in the above incorporated U.S. patent application Ser. No. 08/233, 091, (RD-23,332) to control operation of navigation set 50 and emitter 52 in a manner designed to reduce power consumption. A real-time clock module 60 can be coupled to tracking unit controller 58 so as to periodically enable the controller to resume operation after the controller has been in a "sleep-mode" associated with a low power mode of operation. Preferably, tracking unit controller 58 includes sufficient memory and throughput capability to process data acquired from a suite of respective sensing elements 68. (e.g., temperature sensing element 68A, pressure sensing element 68B, strain gauge 68C and limit switch 68D).

A power source, such as a battery 62, can be conveniently used to enable operation of mobile tracking unit 10 for relatively short periods of time. For example, notwithstanding the advantageous power reduction techniques disclosed in patent application Ser. No. 08/233,091, expendable chemical batteries may require burdensome maintenance, and consequently may not be fully desirable, especially for applications that require relatively long service life. Thus, as shown in FIG. 2, it may be desirable that battery 62 be a rechargeable battery, such as a nickel-cadmium battery or the like, coupled to a suitable charging circuit 64. It will be appreciated, therefore, that a mobile tracking unit or any electrically powered device which is operated in a power-starved environment will significantly benefit from an apparatus 90 wherein incidental vibratory motion that results from normal vehicular travel is converted to electrical power in accordance with the present invention.

As shown in FIG. 2, apparatus 90 is coupled to supply electrical power to charging circuit 64. The charging circuitry typically includes suitable charging regulators and voltage and current sensors (not shown) monitored by the controller for determining the condition of the battery, and can be directly integrated in apparatus 90. A backup battery (not shown) can be conveniently provided to further enhance reliable operation of the mobile tracking unit.

Figure 3:
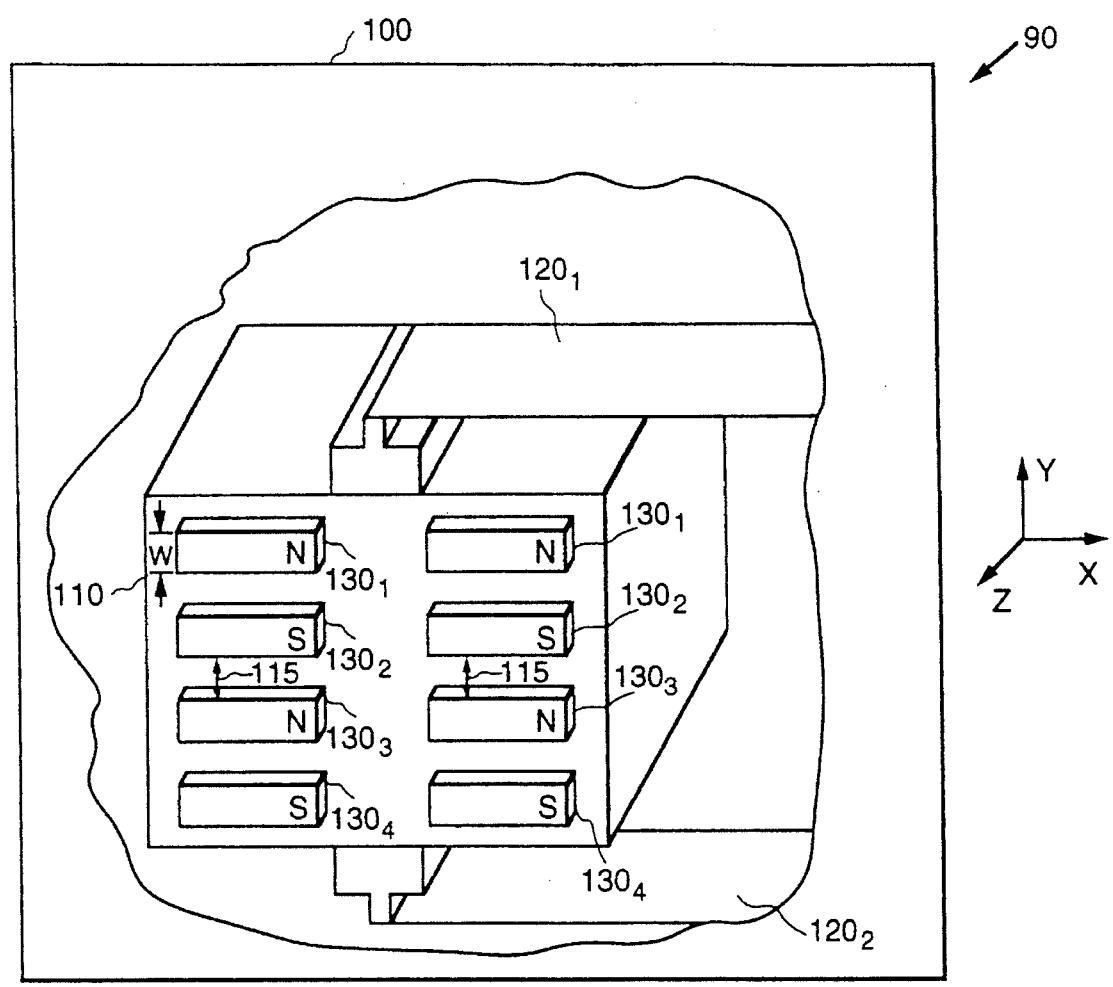
FIG. 3 is a partially cutaway isometric view of an apparatus for converting vibratory motion to electrical energy in accordance with the present invention.
Figure 4:
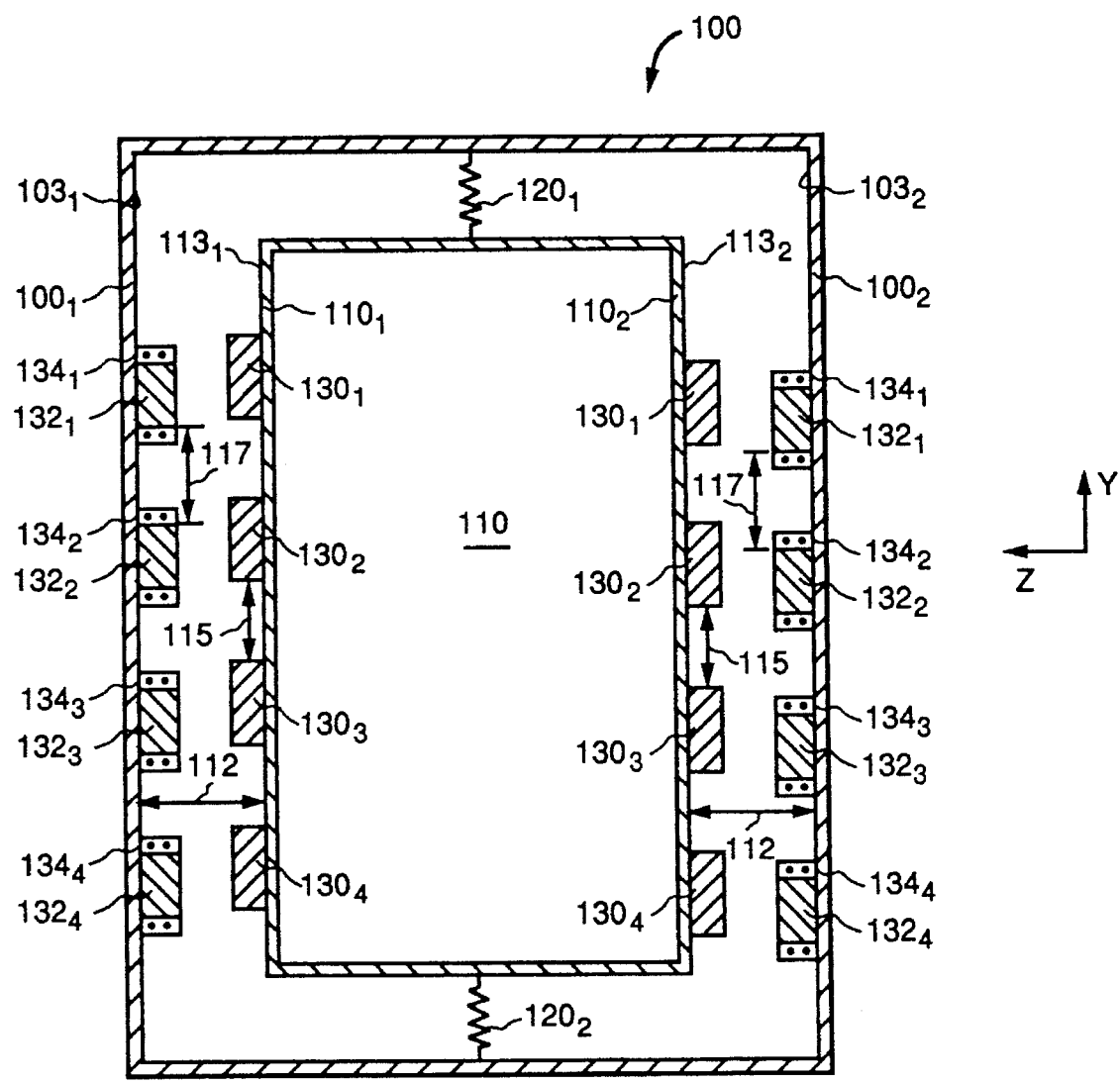
FIG. 4 is a generally schematic view showing further details of the apparatus of FIG. 3 including an exemplary spatial arrangement for rows of magnets and coil assemblies in accordance with the present invention.
Figure 5:
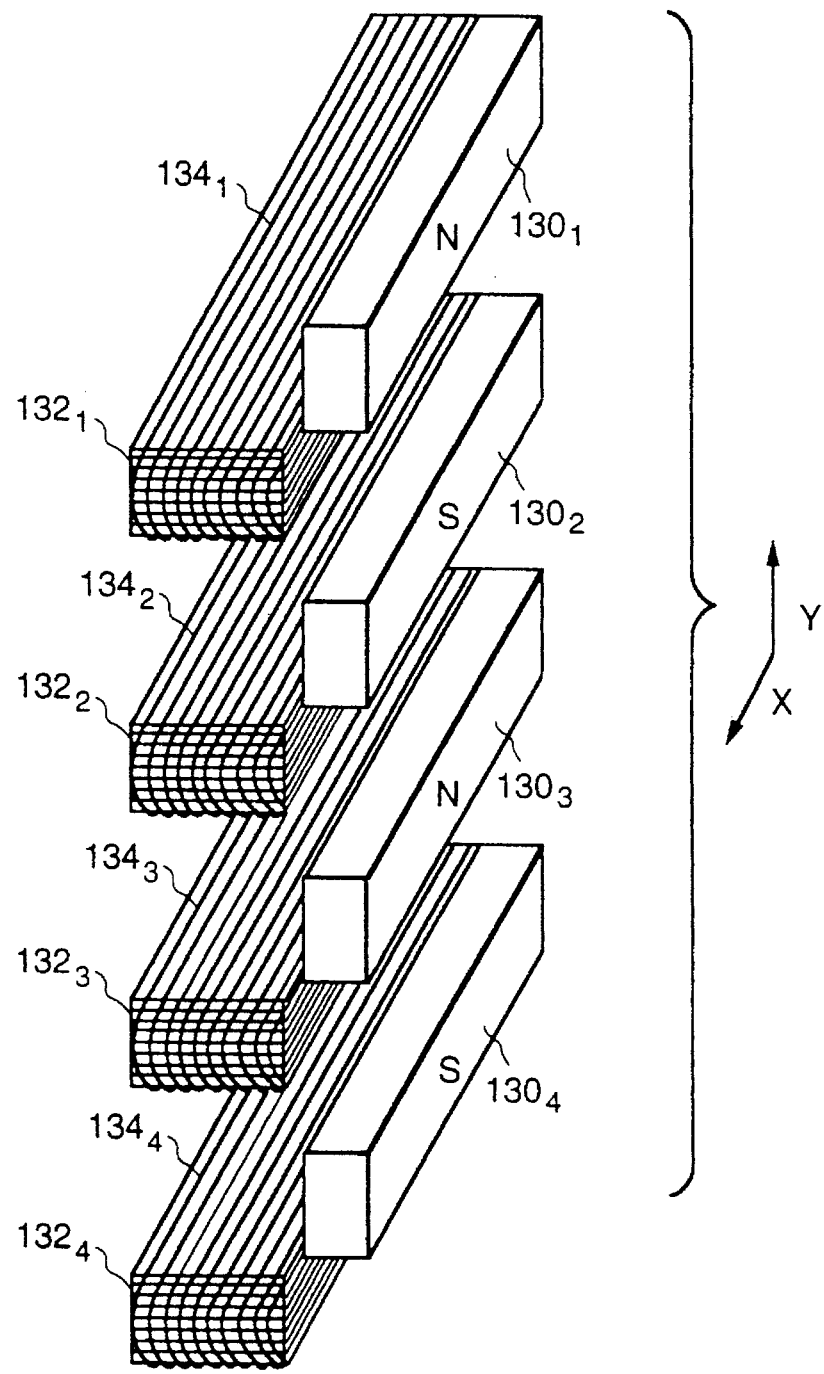
FIG. 5 is an isometric view of the rows of magnets and coil assemblies of FIG. 4.

FIGS. 3, 4 and 5 show details of apparatus 90 for converting vibratory motion along a predetermined vibration axis (here Y axis) to electrical energy in accordance with the present invention. As seen in FIGS. 3 and 4, apparatus 90 comprises an enclosure 100 having first and second opposite walls $100_1$ and $100_2$ (FIG. 4) substantially parallel to one another. A carrier structure 110 in enclosure 100 has first and second opposite walls $110_1$ and $110_2$ (FIG. 4) substantially parallel to one another. As seen in FIG. 3 (and schematically shown in FIG. 4) suspension means, such as flexural springs $120_1$ and $120_2$, suspend structure 110 in the enclosure so that corresponding first walls ($100_1$ and $110_1$) and corresponding second walls ($100_2$ and $110_2$), respectively, face one another with a predetermined spacing 112 (FIG. 4) therebetween. Flexural springs $120_1$ and $120_2$ are specifically designed to allow reciprocating movement of structure 110 relative to enclosure 100 along the vibration axis (here Y axis) in response to the vibratory motion. As seen in FIG. 3, flexural springs $120_1$ and $120_2$ may each comprise a relatively flat cantilever or leaf spring rigidly supported at one end to enclosure 100 and holding structure 110 at its other end. The flexural springs provide a flexural direction substantially aligned with the vibration axis, that is, freedom of movement is substantially null or nonexistent along mutually orthogonal axes X and Z (FIG. 3) but not along the vibration axis (here Y axis).

FIG. 4 shows that a separate magnet set $130_1$–$130_4$ is attached or integrated to a respective outer surface ($113_1$ and $113_2$) of the first and second walls of structure 110 and thus, in this embodiment, structure 110 operates as a magnet carrier structure. Each separate magnet set produces a respective magnetic flux. As best seen in FIG. 3, each separate magnet set comprises a plurality of magnet rows extending along a longitudinal axis (here X axis) situated at a predetermined angle relative to the vibration axis. Although such predetermined angle is shown as about 90°, angular ranges from about 85° to about 105° can alteratively be employed equally effectively. In each separate magnet set, the plurality of magnet rows is in spaced relationship with one another to have a predetermined magnet-row interspace, e.g., magnet row interspace 115 between magnet rows $130_2$ and $130_3$. Preferably, the magnet-row interspace is chosen approximately equal to the width dimension W of each magnet row which in turn is approximately equal to expected amplitude of vibration. As shown in FIGS. 3 and 5, any two consecutive ones of the magnet rows are permanently magnetized to have an opposite magnetic polarity (designated as to north and south poles by letters N and S, respectively) with respect to one another. As seen in FIGS. 4 and 5, a separate coil assembly set made up of armature rows $132_1$–$132_4$ and armature row windings $134_1$–$134_4$ predeterminedly wrapped or wound about an associated armature row is attached to a respective inner surface ($103_1$ and $103_2$) of the first and second walls of the enclosure. In each separate coil assembly set, the plurality of armature rows is in spaced relationship with one another to have a predetermined armature row interspace, e.g., armature row interspace 117 between armature rows $132_1$ and $132_2$.

As best seen in FIG. 5, the plurality of armature rows, being substantially configured and dimensioned like the plurality of magnet rows, extends substantially along the longitudinal axis (here X axis). Each armature row is situated to be magnetically coupled to a respective one of the magnet rows so that whenever structure 110 and the enclosure move reciprocally with respect to one another along the vibration axis, magnetic flux changes cause each of the armature row windings to produce electrical current.

Those skilled in the art will appreciate that the placement for the separate magnet sets with respect to the coil assembly sets can be reversed with equally effective results; that is, instead of the separate magnet sets being attached to respective outer surfaces ($113_1$ and $113_2$) of the first and second walls of structure 110, the separate magnet sets could be attached to respective inner surfaces ($103_1$ and $103_2$) of the first and second walls of the enclosure. In this alternate embodiment, the separate coil assembly sets would be attached to respective outer surfaces ($113_1$ and $113_2$) of the first and second walls of structure 110 instead of respective inner surfaces ($103_1$ and $103_2$) of the first and second walls of the enclosure. In this alternate embodiment, structure 110 would operate as a coil-assembly carrier structure instead of operating as a magnet carrier structure. In each case, the respective material for the enclosure, carrier structure and armature rows can be chosen of a suitable ferromagnetic material such as various forms of iron, steel, cobalt, nickel and their alloys in order to provide good magnetic coupling between corresponding magnet and coil assembly sets. To further improve the magnetic coupling, the respective wall thickness of the container and the enclosure is each suitably chosen to effectively conduct the respective magnetic flux produced by the separate magnet sets.

A key advantage of the present invention which allows for avoiding magnetic detenting effects is achieved through the specific arrangement of respective facing magnet and coil assembly rows with respect to one another. For example, from FIG. 4, it can be appreciated that the respective magnet-row and armature-row interspaces are chosen to be sufficiently different from one another so that at any given position encountered while the carrier structure and the enclosure move reciprocally with respect to one another no more than about one of any of the magnet rows substantially corresponds with any one of the armature rows; that is, the magnet rows and the armature rows exhibit an alignment analogous to sliding vernier scales wherein essentially only one marking at a time is directly aligned in the sliding vernier scales. This arrangement advantageously reduces the tendency of the magnet rows to attract or pull the armature rows to a preferred spot. To further reduce the tendency to snap to a preferred spot, each separate magnet and coil assembly set may be asymmetrically positioned along the vibration axis to offset opposing magnetomotive forces therein. For example, each magnet row on the outer surface of the first wall of the container can have a predetermined displacement along the vibration axis with respect to each similarly situated magnet row on the outer surface of the second wall of the container. As shown in FIG. 4, magnet row $130_1$ on the first wall of structure 110 exhibits a predetermined displacement with respect to magnet row $130_1$ on the second wall of structure 110. A similar positioning is also provided for the armature bars. For example, armature row $132_2$ on the first wall of enclosure 100 has essentially the same displacement along the vibration axis with respect to armature row $132_2$ on the second wall of enclosure 100. Preferably, the accumulation of displacements of magnet rows across each respective entire wall surface should add up to an overall displacement substantially less than about any one periodic excursion of respective magnet rows. Otherwise, the output currents of the respective coils will differ in phase with respect to each other, and will not contribute efficiently to production of a signal if the coils are connected in series, for example.

Another advantage of the present invention is that structure 110 can be readily designed as a container for battery 62 (FIG. 2) so that the battery and container have a predetermined inertial mass chosen to maximize or optimize responsiveness to the vibratory motion along the vibration axis, i.e., optimize the reciprocating movement frequency between the container and the enclosure in order to maximize or optimize electrical power being supplied to the battery. See, for example, textbook by W. E. Boyce and R. C. DiPrima, ELEMENTARY DIFFERENTIAL EQUATIONS AND BOUNDARY VALUE PROBLEMS 135–38 (John Wiley & Sons, 3rd ed. 1977) for further general background on forced vibrations and herein incorporated by reference. It will be apparent that the apparatus is not limited to containing a battery in structure 110 since any desired inertial mass can be situated in, or otherwise affixed to, structure 110.

Figure 6:
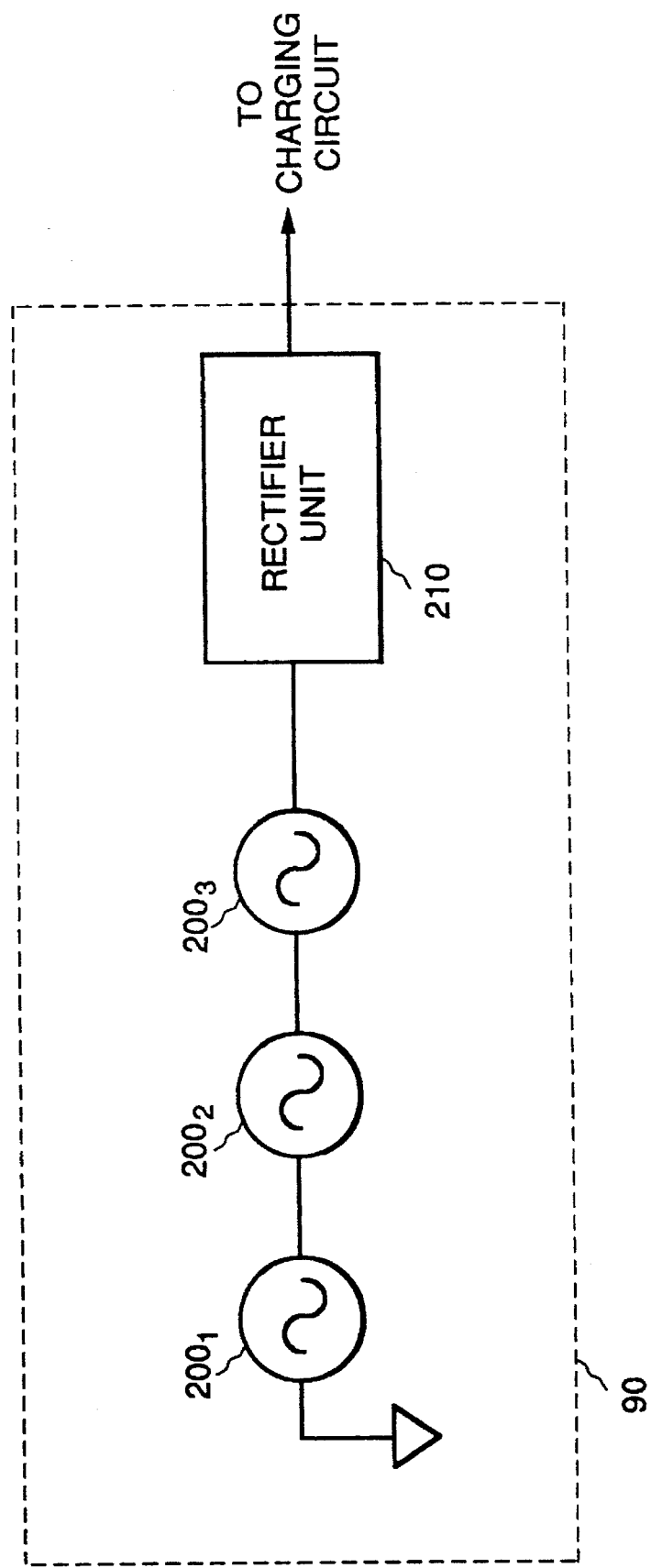
FIG. 6 is an electrical schematic representation of the apparatus of FIG. 3, including a rectifier unit in block diagram form.

FIG. 6 is a schematic electrical representation for apparatus 90 wherein exemplary armature coil rows are represented as alternating current sources 200₁–200₃ serially coupled to supply an overall electrical current to a suitable rectifier unit 210 which, in turn, is coupled to the charging circuit (FIG. 2) or directly coupled to the battery. It should now be appreciated that in operation the present invention makes advantageous contributions to the use of electrically powered devices in a power-starved environment wherein vibratory motion that results from normal vehicular travel is conveniently converted to electrical energy While only certain features of the invention have been illustrated and described herein, many modifications and changes will now occur to those skilled in the art. It is, therefore, to be understood that the appended claims are intended to cover all such modifications and changes as fall within the true spirit of the invention.

What is claimed is:

1. Apparatus for converting vibratory motion along a predetermined vibration axis to electrical energy, said apparatus comprising:

an enclosure;

a magnet carrier structure in said enclosure;

suspension means for suspending said carrier structure in said enclosure, said suspension means allowing reciprocating movement of said carrier structure relative to said enclosure substantially along said vibration axis in response to the vibratory motion;

first and second magnet means attached to said carrier structure for producing a respective magnetic flux, each separate magnet means comprising a plurality of magnets arranged in rows, respectively, extending along a longitudinal axis situated at a predetermined angle relative to the vibration axis, the magnets in each of said magnet means being in spaced relationship with one another to have a predetermined magnet-row interspace between one another, and any two consecutive ones of said magnet rows having an opposite magnetic polarity with respect to one another; and first and second coil assembly means, each of said coil assembly means comprising a plurality of coil assemblies attached to said enclosure and arranged in armature rows, each of said coil assembly means being situated to be magnetically coupled to separate ones of the first and second magnet means, respectively, for producing electrical current due to magnetic flux changes whenever the carrier structure and the enclosure move reciprocally with respect to one another along said vibration axis, each magnet of said first and second magnet means having two magnetic poles spaced substantially equidistantly from any of said coil assemblies, wherein in each of the armature rows each separate coil assembly is situated in spaced relationship with one another to have a predetermined armature-row interspace between one another, the predetermined magnet-row interspace and the armature-row interspace being sufficiently different from one another so that at any given position encountered while the carrier structure and the enclosure move reciprocally with respect to one another no more than about one of any of the magnet rows substantially corresponds with any one of the armature rows, thereby minimizing any detent effects.

2. The apparatus of claim 1 wherein the predetermined magnet-row interspace substantially corresponds to the width dimension of each magnet row.

3. The apparatus of claim 1 wherein the predetermined angle between the vibration axis and the longitudinal axis is about 90°.

4. The apparatus of claim 3 wherein the magnet rows comprise permanent magnets.

5. The apparatus of claim 1 wherein each separate coil assembly comprises a plurality of armature rows extending along said longitudinal axis, each armature row being predeterminedly wrapped by a respective armature row winding.

6. The apparatus of claim 1 wherein said enclosure, comprises a predetermined ferromagnetic material.

7. The apparatus of claim 1 wherein each armature row comprises a predetermined ferromagnetic material.

8. The apparatus of claim 1 wherein said carrier structure comprises first and second opposite walls substantially parallel to one another, and wherein the magnet rows are affixed, respectively, to each of the first and second walls of said carrier structure, each magnet row on the first wall of said carrier structure having a predetermined displacement along said vibration axis with respect to each similarly situated magnet row on the second wall of said carrier structure.

9. The apparatus of claim 8 wherein either of said armature rows on said enclosure has substantially said predetermined displacement along said vibration axis with respect to the other similarly situated armature row on said enclosure.

10. The apparatus of claim 1 further comprising a rectifier circuit coupled to the coil assemblies to impart a predetermined rectification to the electrical current produced therein.

11. The apparatus of claim 10 wherein said carrier structure is adapted to contain a battery coupled to said rectifier circuit.

12. The apparatus of claim 10 wherein said battery and said carrier structure have a predetermined inertial mass chosen to optimize responsiveness to the vibratory motion along the vibration axis, thereby optimizing electrical power supplied to the battery from said rectifier circuit.

13. The apparatus of claim 1 wherein said suspension means comprises a pair of cantilever springs.

14. The apparatus of claim 13 wherein each cantilever spring provides a flexural direction substantially aligned with the vibration axis.

15. The apparatus of claim 1 wherein said suspension means comprises respective leaf springs.

16. Apparatus for converting vibratory motion along a predetermined vibration axis to electrical energy, said apparatus comprising:

an enclosure;

a coil assembly carrier structure in said enclosure;

flexural springs for suspending said coil assembly carrier structure in said enclosure, said flexural springs allowing reciprocating movement of said carrier structure relative to said enclosure substantially along said vibration axis in response to the vibratory motion;

separate magnet sets attached to said enclosure to produce a respective magnetic flux, each separate magnet set comprising a plurality of magnets arranged in rows extending along a longitudinal axis situated at a predetermined angle relative to the vibration axis and being in spaced relationship with one another to have a predetermined magnet-row interspace between one another; and separate coil assembly sets attached to said carrier structure and situated to be magnetically coupled to separate ones of the magnet sets, respectively, to produce electrical current due to magnetic flux changes whenever the carrier structure and the enclosure move reciprocally with respect to one another along said vibration axis, each separate coil assembly set comprising a plurality of coil assemblies arranged in armature rows extending along said longitudinal axis and being in spaced relationship with one another to have a predetermined armature-row interspace between one another, each armature row being predeterminedly wrapped by a respective armature row winding.

17. The apparatus of claim 16 wherein the predetermined magnet-row interspace substantially corresponds to the width dimension of each magnet row.

18. The apparatus of claim 16 wherein any two consecutive ones of the magnet rows have an opposite magnetic polarity with respect to one another.

19. The apparatus of claim 18 wherein the predetermined angle between the vibration axis and the longitudinal axis is about 90°.

20. The apparatus of claim 19 wherein the magnet rows comprise permanent magnets.

21. The apparatus of claim 16 wherein the first and second walls of said carrier structure and said enclosure, respectively, comprise a predetermined ferromagnetic material.

22. The apparatus of claim 16 wherein each armature row comprises a predetermined ferromagnetic material.

23. The apparatus of claim 21 wherein each magnet row on the inner surface of the first wall of said enclosure has a predetermined displacement along said vibration axis with respect to each similarly situated magnet row on the inner surface of the second wall of said enclosure.

24. The apparatus of claim 23 wherein each armature row on the outer surface of the first wall of said carrier structure has substantially said predetermined displacement along said vibration axis with respect to each similarly situated armature row on the outer surface of the second wall of said carrier structure.

25. The apparatus of claim 16 further comprising a rectifier circuit coupled to the coil assembly sets to impart a predetermined rectification to the electrical current produced therein.

26. The apparatus of claim 25 wherein said carrier structure is adapted to contain a battery coupled to said rectifier circuit.

27. The apparatus of claim 26 wherein said battery and said carrier structure have a predetermined inertial mass chosen to optimize responsiveness to the vibratory motion along the vibration axis, thereby optimizing electrical power supplied to the battery from said rectifier circuit.

28. The apparatus of claim 16 wherein said flexural springs comprise a pair of cantilever springs each having a flexural direction substantially parallel to the vibration axis.

29. A mobile tracking unit comprising:
 a navigation set for generating data substantially corresponding to a respective vehicle position;
 an electromagnetic radiation emitter for transmitting predetermined data associated with the vehicle to a remote location; and
 an apparatus for converting vibratory motion along a predetermined vibration axis to electrical energy and coupled to energize said navigation set and said electromagnetic emitter during vehicle travel, said apparatus comprising:
 an enclosure;
 a magnet carrier structure in said enclosure;
 suspension means for suspending said carrier structure in said enclosure, said suspension means allowing reciprocating movement of said carrier structure relative to said enclosure substantially along said vibration axis in response to the vibratory motion;
 separate magnet means attached to said carrier structure for producing a respective magnetic flux, each separate magnet means comprising a plurality of magnet rows extending along a longitudinal axis situated at a predetermined angle relative to the vibration axis, said plurality of magnet rows being in spaced relationship with one another to have a predetermined magnet-row interspace between one another; and
 separate coil assembly means attached to said enclosure and situated to be magnetically coupled to separate ones of the magnet means for producing electrical current due to magnetic flux changes whenever the carrier structure and the enclosure move reciprocally with respect to one another along said vibration axis, each separate coil assembly means comprising a plurality of armature rows extending along said longitudinal axis and being in spaced relationship with one another to have a predetermined armature-row interspace between one another, each armature row being predeterminedly wrapped by a respective armature-row winding;
 the magnet-row interspace and the armature-row interspace being sufficiently different from one another so that at any given position encountered while the carrier structure and the enclosure move reciprocally with respect to one another no more than about one of any of the magnet rows substantially corresponds with any one of the armature rows, thereby minimizing any detent effects in said apparatus for converting vibratory motion along a predetermined vibration axis to electrical energy.

30. The mobile tracking unit of claim 29 wherein said navigation set comprises a GPS receiver.

* * * * *